US00RE44999E

(19) United States
(12) Reissued Patent
Murray et al.

(10) Patent Number: US RE44,999 E
(45) Date of Reissued Patent: Jul. 8, 2014

(54) ADAPTOR WITH GIMBAL MOUNTED SENSOR

(75) Inventors: Peter Grahame Murray, Victoria (AU); Jeffrey Laurance Jackel, Victoria (AU)

(73) Assignee: Beon Light Corporation Pty Ltd, Victoria (AU)

(21) Appl. No.: 12/478,544

(22) Filed: Jun. 4, 2009

Related U.S. Patent Documents

Reissue of:
(64) Patent No.: 7,364,329
Issued: Apr. 29, 2008
Appl. No.: 10/551,937
PCT Filed: Apr. 2, 2004
PCT No.: PCT/AU2004/000431
§ 371 (c)(1),
(2), (4) Date: Oct. 4, 2005
PCT Pub. No.: WO2004/088799
PCT Pub. Date: Oct. 14, 2004

(30) Foreign Application Priority Data

Apr. 4, 2003 (AU) ..... 2003901646

(51) Int. Cl.
*F21V 23/04* (2006.01)

(52) U.S. Cl.
USPC ..... 362/394; 362/282; 362/287; 362/276; 340/541; 340/549; 340/555; 340/565; 250/214 AL

(58) Field of Classification Search
USPC ..... 362/394, 419, 802, 240, 249.01, 362/249.02, 249.03, 269, 282, 283, 285, 362/287, 319, 326, 329, 334, 363, 372, 800, 362/275–277; 340/326, 539.26, 541, 545.2, 340/549, 555, 565, 567; 250/214 AL
See application file for complete search history.

(56) References Cited

U.S. PATENT DOCUMENTS

| | | | | |
|---|---|---|---|---|
| 3,588,893 | A * | 6/1971 | McCloskey | 169/61 |
| 3,679,906 | A * | 7/1972 | Myers | 250/239 |
| 4,023,035 | A | 5/1977 | Rodriguez | |
| 4,823,051 | A * | 4/1989 | Young | 315/155 |
| 4,967,069 | A * | 10/1990 | Yamakawa | 250/221 |
| 5,258,899 | A * | 11/1993 | Chen | 362/394 |
| 5,381,323 | A * | 1/1995 | Osteen et al. | 362/276 |
| 5,440,292 | A * | 8/1995 | Bedrosian | 340/567 |
| 5,455,488 | A | 10/1995 | Rhoades et al. | |
| 5,649,761 | A * | 7/1997 | Sandell et al. | 362/276 |
| 5,661,370 | A | 8/1997 | Messick | |
| 5,662,411 | A * | 9/1997 | Haslam et al. | 362/276 |
| 5,890,797 | A * | 4/1999 | Bish | 362/419 |
| 6,309,090 | B1 * | 10/2001 | Tukin | 362/276 |
| 6,315,426 | B1 * | 11/2001 | Buller, Jr. | 362/108 |
| 6,454,229 | B1 * | 9/2002 | Voigt et al. | 248/182.1 |
| 6,781,129 | B2 * | 8/2004 | Leen | 250/342 |
| 2003/0210340 | A1 * | 11/2003 | Frederick Romanowich | 348/272 |

FOREIGN PATENT DOCUMENTS

JP 2003-317537 A 11/2003

* cited by examiner

*Primary Examiner* — Hargobind S Sawhney
(74) *Attorney, Agent, or Firm* — Sughrue Mion, PLLC

(57) ABSTRACT

An adaptor (10) including a sensor (18), a gimbal housing (12) having a male connector (14) at one end and an female connector (16) at another end, wherein the male connector (14) is configured to connect with an electrical socket and the female connector (16) is configured to connect with an electrical device, and a circuit for selectively controlling the electrical device in response to the sensor (18). The gimbal housing (12) is adapted to rotate around the male connector (14) about a first axis and support the sensor (18) for independent rotation about a second axis perpendicular to the first axis so that the sensor (18) can be moved to a selectable sensing orientation.

24 Claims, 8 Drawing Sheets

ADAPTOR WITH GIMBAL MOUNTED SENSOR

Matter enclosed in heavy brackets [ ] appears in the original patent but forms no part of this reissue specification; matter printed in italics indicates the additions made by reissue.

This is a National Stage of International Application PCT/AUI2004/000431, with an international filing date of Apr. 2, 2004, which was published as WO 2004/088799, and the complete disclosure of which is incorporated into this application by reference.

FIELD OF THE INVENTION

The present invention relates to an adaptor, and in particular, an adaptor for domestic lighting applications having a gimbal mounted detector.

In the context of this specification, "gimbal" means a device with two mutually perpendicular axes of rotation, thus giving free angular movement in two directions, on which an object may be mounted.

BACKGROUND OF THE INVENTION

In recent years, various automatic switching devices have been marketed, which function to switch lighting on and off, depending on some sensed condition. For example, an ambient light level sensor may be incorporated into the switching device so as to switch on the light when the ambient light falls below a certain level (e.g. when night falls). Alternatively, there may be a motion sensor for detecting motion within a particular field of view of the detector and switching the light on when motion is detected.

One known motion detector arrangement for switching lighting has a housing which must be fixed in place (e.g high up on an external wall) and must be wired during installation thereof so as to connect into the mains power supply. This arrangement is relatively expensive and requires installation by an electrician. Additionally, the installation is not easily moved once it is fixed in place and wired into the mains power supply.

U.S. Pat. No. 4,823,051 by Young describes an infra-red actuated control switch assembly. This assembly has a motion detecting capability and is housed within a plug and socket adaptor to be interposed between a light bulb and a socket in normal domestic applications. The sensing system described by Young has a 360° range in the horizontal plane, with two separate sensing fields in a vertical field of view. This arrangement does not, however, allow for the field of view of the motion sensor to be directionally targeted. Thus, in situations where it is not desired to switch the light based on motion in a certain part of the room, the light will nonetheless be undesirably switched on. Thus, the 360° range of the assembly described by Young lacks directional adjustability and may inconveniently switch on when not desired.

It is desired to provide an adaptor device which is relatively inexpensive, easy to install and remove and has a motion sensing capability which can be directionally targeted, or to at least provide a useful alternative to the prior art.

The reference to any prior art in this specification is not, and should not be taken as, an acknowledgment or any form of suggestion that that prior art forms part of the common general knowledge in Australia.

SUMMARY OF THE INVENTION

According to the present invention, there is provided an adaptor comprising a gimbal mounted sensor adapted to be interposed between an electrical device and a power supply, wherein power is selectively supplied to the electrical device in response to the sensor.

The present invention also provides an adaptor comprising:

a sensor;

a gimbal housing having a male connector at one end and a female connector at another end, wherein the male connector is configured to connect with an electrical socket and the female connector is configured to connect with an electrical device; and a circuit for selectively controlling the electrical device in response to the sensor;

wherein the gimbal housing is adapted to rotate around the male connector about a first axis and support the sensor for independent rotation about a second axis perpendicular to the first axis so that the sensor can be moved to a selectable sensing orientation.

Preferably, the sensor comprises one of a motion detector, an infrared detector, a photodetector and a sound detector.

Advantageously, the male connector and the female connector are respectively provided on opposite ends of the gimbal housing in alignment with the first axis.

Preferably, the electrical socket is a light socket.

Advantageously, the electrical device comprises a light source. Most advantageously, the electrical device is a light bulb. Alternatively, the electrical device comprises one of a mobile telephone, a sound alarm, a security device, and a monitoring device. Preferably, the security device comprises a burglar alarm. Preferably, the monitoring device comprises a surveillance camera.

Preferably, the sensor is substantially spherical in shape and the gimbal housing is substantially annular in shape so that the sensor is supported at least partially inside the gimbal housing between the male connector and the female connector. More preferably, the gimbal housing has one or more openings formed therein to correspond with at least some selectable sensing orientations of the sensor. Most preferably, the one or more openings comprise first and second windows respectively formed in opposite sides of the gimbal mounting between the second axis and the female connector.

Advantageously, the gimbal housing further comprises a locking mechanism for lockably rotating the gimbal housing about the male connector. More advantageously, the locking mechanism comprises a ratchet wheel and pawl.

Preferably, the sensor is adapted to rotate less than 360° around the second axis. More preferably, the sensor is adapted to rotate to a maximum of about 350° around the second axis.

Advantageously, the gimbal housing is adapted to rotate less than 360° around the first axis. More advantageously, the gimbal housing is adapted to rotate to a maximum of about 350° around the first axis.

The present invention further provides a method for operating an electrical device comprising the steps of:

connecting one end of an adaptor to the electrical device and a second end to an electrical socket;

supporting a sensor in a gimbal housing between the ends of the adaptor so that the sensor is rotatable about two mutually orthogonal axes;

moving the sensor to a selectable sensing orientation; and selectively controlling the electrical device in response to the sensor.

Advantageously, the electrical device comprises a light source. Most advantageously, the electrical device is a light bulb. Alternatively, the electrical device comprises one of a mobile telephone, a sound alarm, a security device, and a monitoring device. Preferably, the security device comprises a burglar alarm. Preferably, the monitoring device comprises a surveillance camera.

Preferably, the sensor comprises one of a motion detector, an infrared detector, a photodetector and a sound detector.

BRIEF DESCRIPTION OF THE DRAWINGS

Embodiments of the invention will be described in further detail hereinafter, with reference to the drawings, in which.

DETAILED DESCRIPTION OF THE PREFERRED EMBODIMENTS

Figure 1:
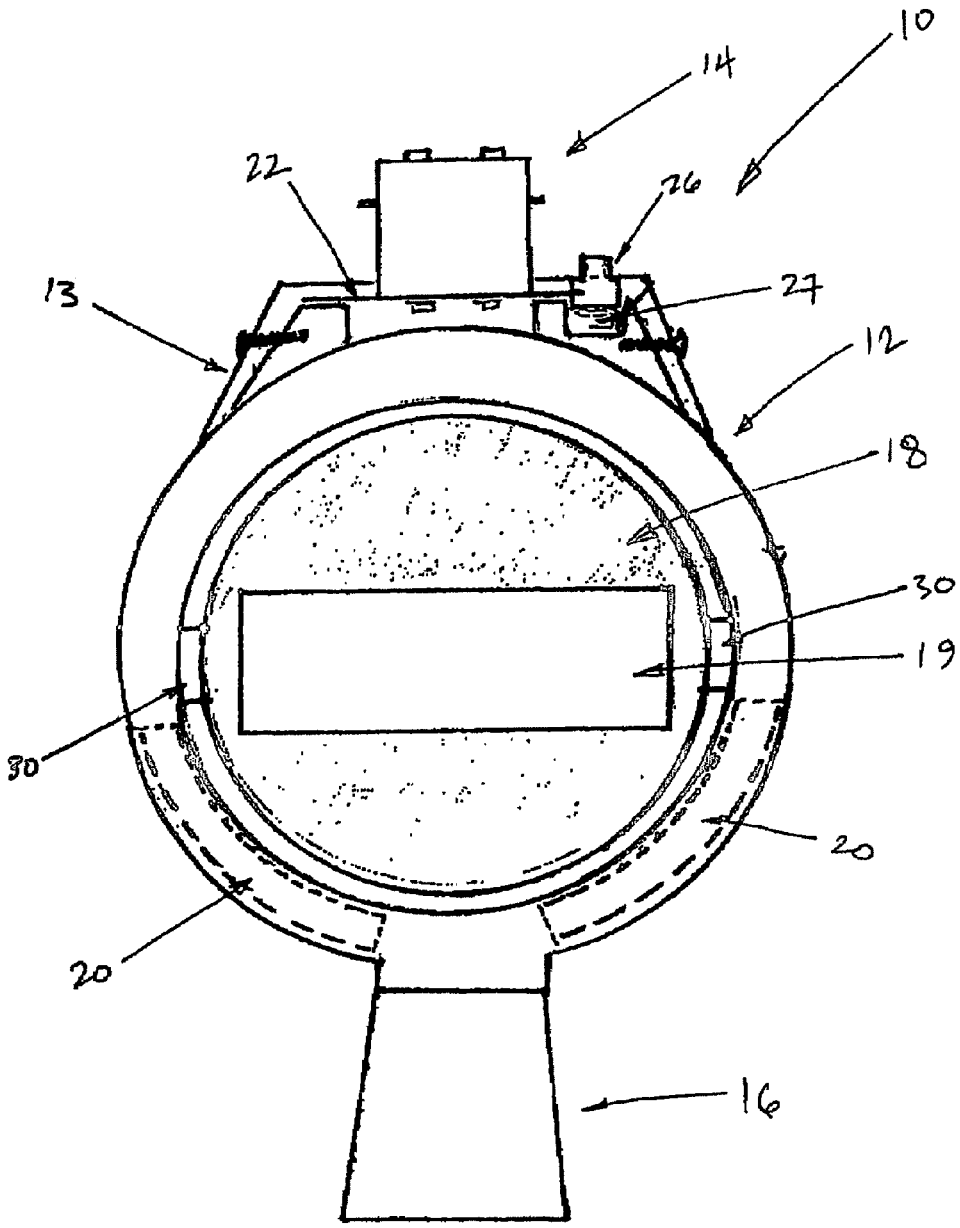
FIG. 1 is a front view of an adaptor according to one embodiment of the invention.

In this specification, and specifically including the description and drawings, like reference numerals indicate like features, functions or parts, unless otherwise indicated.

Figure 2:
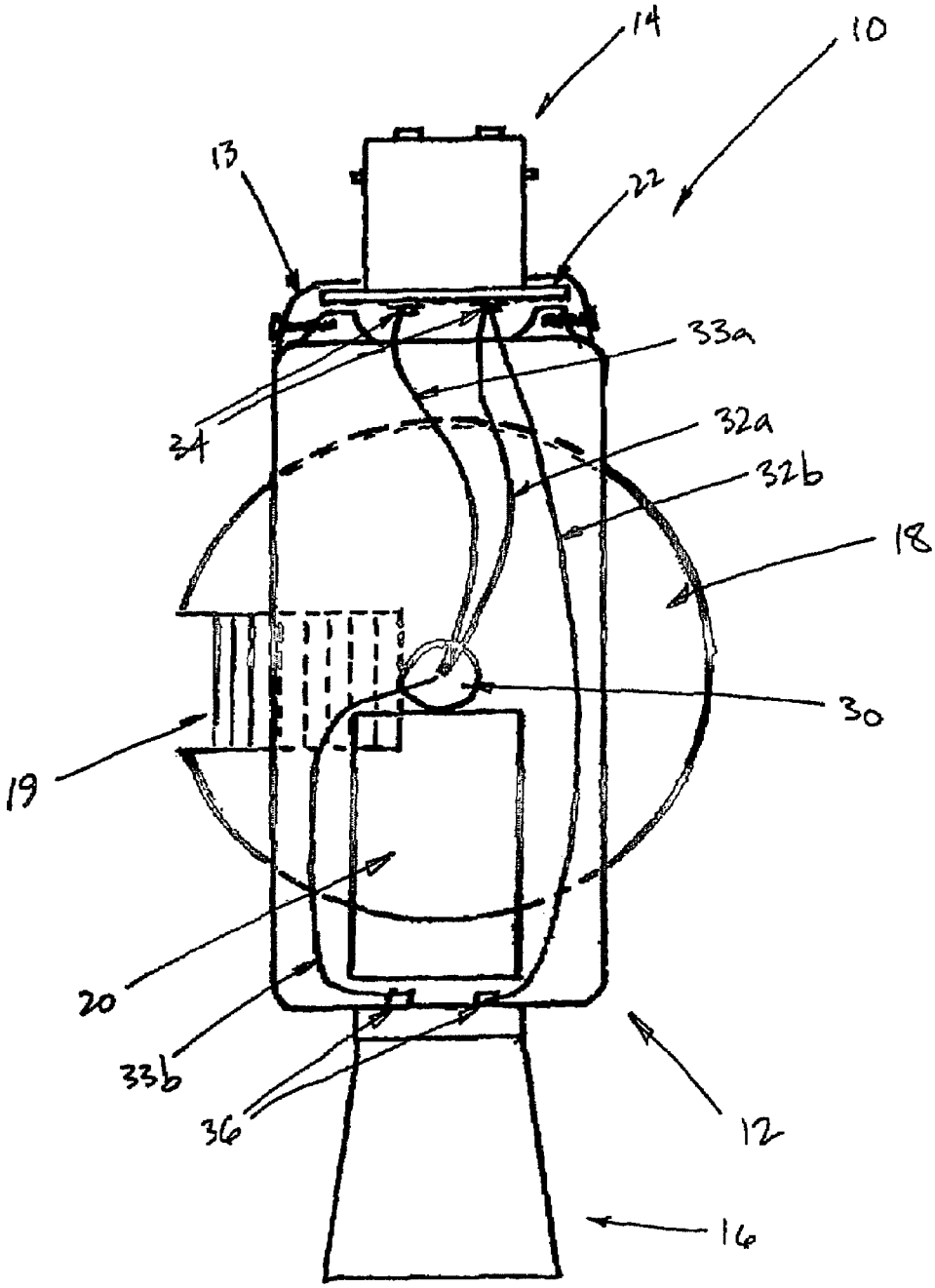
FIG. 2 is a side view and schematic representation of the adaptor of FIG. 1.
Figure 3:
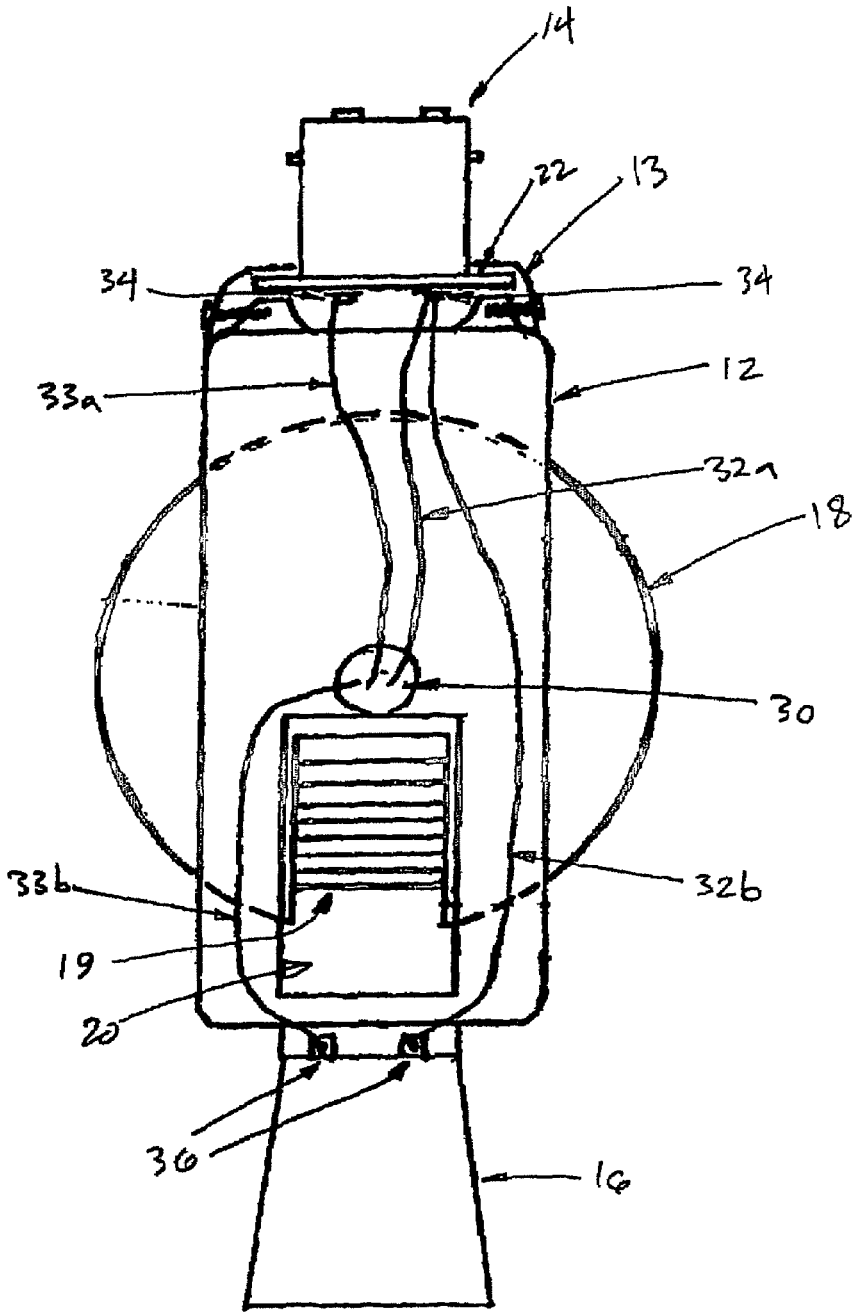
FIG. 3 is a side view and schematic representation of the adaptor of FIG. 1, with the motion detector rotated into an alternate position.
Figure 4A:
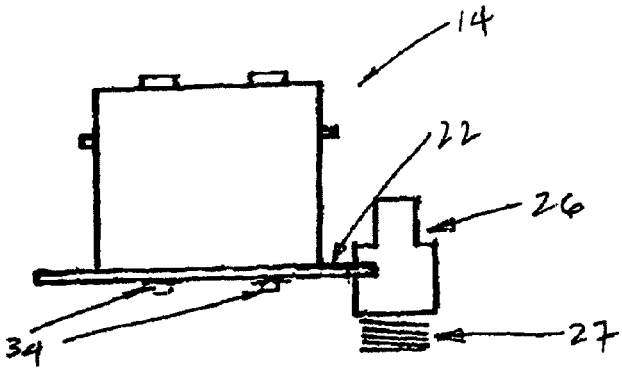
FIGS. 4A, 4B and 4C show a plug part of the adaptor, illustrating the configuration of a locking pin and locking plate associated with the plug.
Figure 4B:
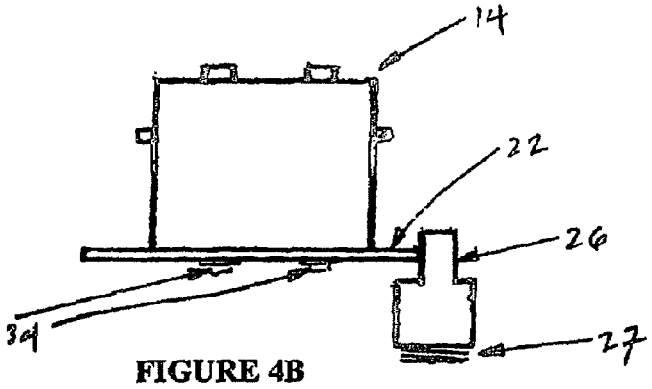
Figure 4C:
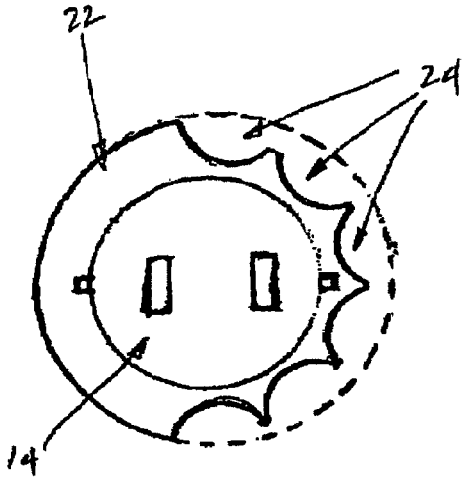

Referring to FIGS. 1 to 3, there is shown an adaptor 10 having a housing 12 of a generally shallow cylindrical shape. A motion detector 18 (also termed a motion sensor) is located within the cylindrical body of the housing 12 and connected thereto by housing connectors 30. The housing connectors 30 allow rotation of the motion detector 18 relative to the housing 12 about a lateral (or generally horizontal) axis extending through the housing connectors 30 and the center of the motion detector 18.

Figure 6:
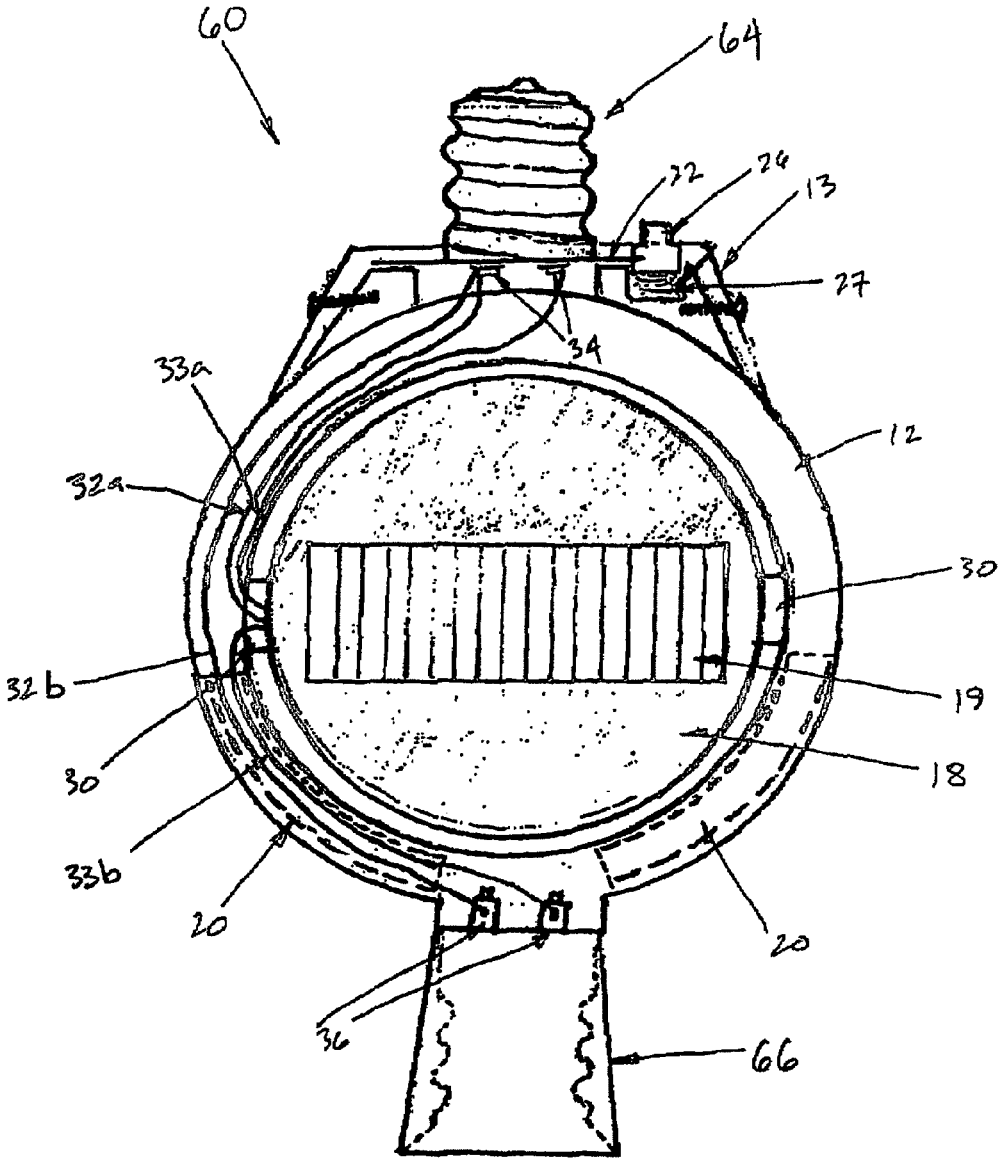
FIG. 6 is a front view and schematic diagram of an adaptor of another embodiment of the invention.

At a top end of the housing 12 is mounted a top housing part 13 having a plug part 14 connected thereto. The plug part 14 is configured to be inserted into a light socket such as is commonly used for domestic lighting in Australia. The arrangement or configuration by which the plug part 14 engages with a socket may be modified to suit the type of domestic lighting connections prevalent in different countries. For example, FIG. 6 shows an alternative embodiment of the adaptor having a screw in plug part 64 in place of the plug part 14 of FIGS. 1 to 4.

The top housing part 13 may be integrally formed with housing 12 or separately formed and connected thereto by conventional means, such as adhesive or mechanical attachment. The top housing part 13 serves to provide a substructure of the housing 12 within which the plug part 14 may rotate relative to the housing 12 about a longitudinal axis of the adaptor 10.

Plug terminals 34 are arranged on the underside of the plug part 14 and concealed within the top housing part 13 for connecting conductors thereto by which power is provided to a light bulb fitted into socket part 16.

The top housing part 13 also accommodates a locking pin 26 which engages with a locking plate 22 on the bottom of the plug part 14. The locking pin 26 moves within a channel in the top housing part 13 and is biased by a spring 27 into a normal extended position in which it engages with the locking plate 22 to prevent rotation of the plug part 14 relative to the housing 12. This is illustrated in more detail in FIGS. 4A, 4B and 4C. When the locking pin 26 is depressed, compressing the spring 27, it moves into a retracted position in which it does not engage with the locking plate 22, thus freeing the plug part 14 to rotate relative to the housing 12.

The locking plate 22 has a number of recesses or depressions 24 therein which engage with the locking pin 26 when it is in its extended position. In the exemplary embodiment illustrated in FIGS. 4A to 4C, the locking pin 26 is formed so as to have a base portion formed larger than a top portion. In its extended position, the base portion of the locking pin 26 fits generally into one of the recesses 24 in the locking plate 22. The locking pin 26 is only allowed to move between its extended and retracted positions and is fixed against movement in the plane of the locking plate 22, such that in its extended position, the locking pin 26 fits into a recess 24 and prevents rotational movement of the locking plate 22. In its retracted position, the top part of the locking pin 26 is sufficiently small so that it does not engage with any of the recesses 24, thus allowing rotational freedom of the locking plate 22. However, the top part of the locking pin 26 is still formed sufficiently large to prevent rotation of the locking plate 22 beyond about 90° in each direction by interfering with circumferential parts of the locking plate 22 which do not have recesses 24 formed therein. Other arrangements may be employed for fixing the plug part 14 against rotational movement and preventing rotation beyond about 180°.

On an opposite part of the housing 12 to which the plug part 14 is connected, there is formed a socket part 16 for receiving a light bulb (not shown). The socket part 16 is adapted to receive light bulbs having a plug configuration corresponding to that of plug part 14.

Windows 20 are provided in parts of the housing 12 adjacent the socket part 16 and extending generally between the socket part 16 and those parts of the housing 12 adjacent the housing connectors 30. The windows 20 are arranged to enable transmission of electromagnetic radiation to and from a sensor screen 19 of the motion detector 18 when the motion detector is pivoted so as to point generally downwardly (such as is shown in FIG. 3). The windows 20 are preferably holes, but may alternatively contain some kind of transmissive filter or polarising material. As shown in FIG. 3, the windows 20 are shaped so as to allow a sensing field of the motion detector 18 to extend therethrough when the motion detector 18 is in a vertically downwardly directed orientation. In this position, while the socket part 16 obscures part of the sensing field of the motion detector 18, much of the sensing field will still extend vertically and laterally outward and downward of the adaptor 10. This positional arrangement of the motion detector 18, in combination with the configuration of the windows 20 and the housing 12, allows for the adaptor 10 to be located in a light fixture in a hallway, such that the sensing field of the motion sensor 18 can extend in either direction down the hallway. Additionally, the rotational adjustability of the plug part 14 relative to the housing 12 facilitates simple adjustment of the adaptor 10 for optimal orientation thereof with respect to the hallway. If not for the rotational adjustability of the plug part 14 relative to the housing 12, the adaptor 10, once installed in the light socket, may not be able to be positioned so as to extend the sensing field in both directions down the hallway, for example because of the fixed orientation of the socket in which the adaptor 10 is installed.

The motion sensor 18 depicted in the drawings is preferably of a roughly elliptoid or spherical shape with the sensor screen 19 disposed on an outer portion thereof generally in the direction of a lateral axis of the housing 12. The inner workings of the motion sensor 18 do not form part of this invention. A motion sensor 18 for use in a preferred form of the adaptor 10 may be one that is commercially available. Importantly, the motion sensor 18 must be able to receive and switch mains power and to itself run on mains power. Preferably, the motion sensor 18 has adjustable inputs for adjusting the time after which the motion detector switches off the light following the absence of any sensed motion. Also preferably, the motion sensor 18 may have a manual input adjustment for varying the ambient light level at which the sensor is enabled or disabled from operating.

Shown in FIG. 2 is an arrangement in which the motion sensor 18 is positioned so that its sensor field is directed generally laterally. The direction of the sensor field may be altered by pivoting the motion sensor 18 about the lateral axis through the housing connectors 30, for example so as to direct the sensing field more downwardly than is depicted in FIG. 2.

Figure 5:
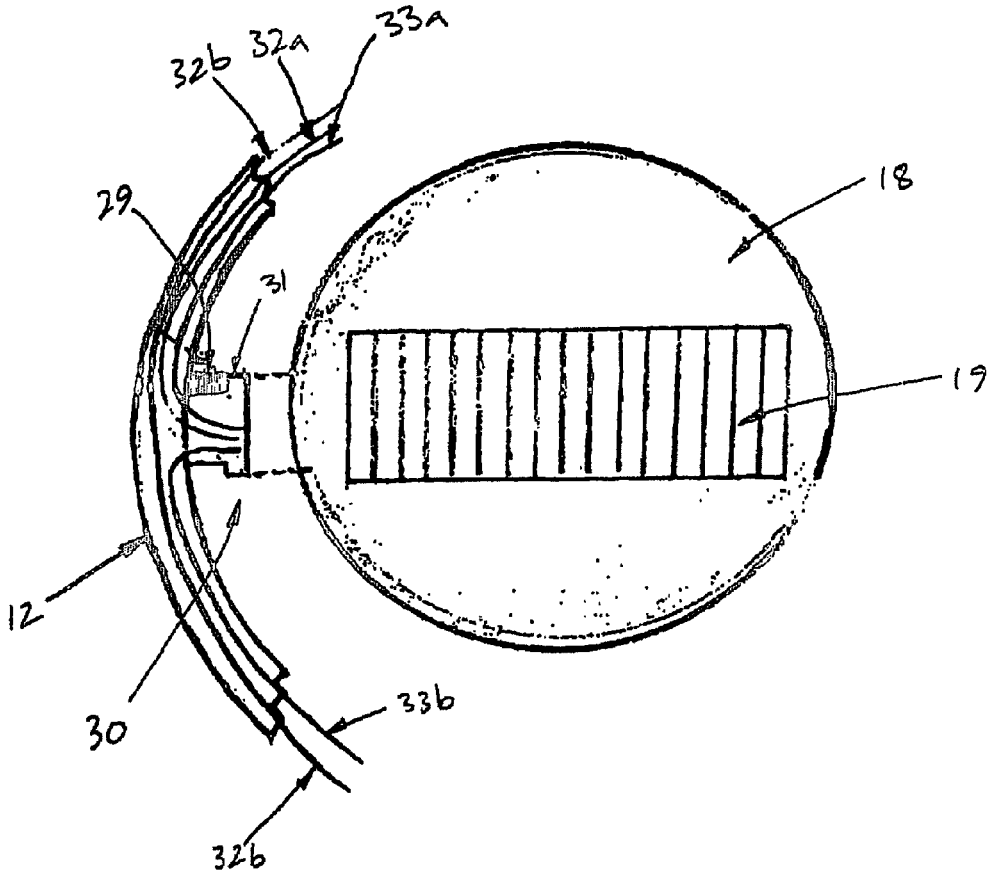
FIG. 5 is a partial cut-away view of the adaptor.

Illustrated in FIGS. 2, 3 and 5 are ground conductors 32a, 32b and active conductors, 33a and 33b for powering the motion detector 18 to thus selectively switch power to a light fitted into socket part 16. The conductors are connected within the housing 12. Ground and active conductors 32a and 33a, respectively, are connected to plug terminals 34 and to the motion detector 18 (through one of the housing connectors 30). An active conductor 33b is also connected to motion detector 18 and to a socket terminal 36 associated with socket part 16, such that when the motion detector 18 senses motion, it switches active power to active conductor 33b, which is supplied to the light globe in socket part 16. A ground conductor 32b is connected between a ground terminal of the socket terminals 36 and a ground terminal of plug terminals 34 for completion of the circuit through the light globe.

In the wiring arrangement shown in the drawings there is no provision for allowing rotation of the plug part 14 or motion sensor 18 without twisting the conductors connected thereto. In an alternative embodiment (not shown) a form of intermediate electrical connector may be used to minimise the twisting effect on the conductors. In a further alternative, the plug terminals 34 may be arranged to allow for pivotal rotation of the plug part 14 without undue twisting of the conductors connected thereto and similarly with electrical connections to the motion detector 18.

FIG. 5 further illustrates the arrangement of the conductors 32a, b and 33a, b within one side of the housing 12. Also shown in FIG. 5 are housing and connector bosses 29, 31 associated with each housing connector 30. The housing boss 29 is fixed to the housing 12, whereas the connector boss 31 rotates about the lateral axis along with rotation of the motion detector 18. The connector boss 31 is arranged to abut the housing boss 29 at the extremities of permissible rotation of the motion detector 18 relative to the housing 12, so as to limit the rotational freedom thereof to a maximum of about 350°. Preferably, the housing boss 29 and connector boss 31 are arranged so as to allow for rotation of the motion sensor 18 from the near vertical on one side of the housing 12, down through the position shown in FIG. 3 and up through to the near vertical on the other side of the housing 12, but not so as to allow rotation of more than about 350°. If excessive rotation were allowed, this may exert undue twisting stress on the conductors connected through housing connector 30. In an alternative embodiment (not shown), if an intermediate connector or other means for preventing excessive twisting stress on the conductors is employed, rotation of the motion detector 18 relative to the housing 12 in excess of 350° may be allowed, in which case housing and connector bosses 29 and 31 are not required.

FIG. 6 illustrates an alternative embodiment of the adaptor, designated by reference numeral 60. This embodiment differs from previously described embodiments only in so far as the plug and socket connections are concerned. In this embodiment, a plug part 64 is provided which allows for a screw-in connection to a socket such as those which are common in North America. A corresponding socket part 66 is provided on an opposite part of the housing 12 for receiving a screw-in light bulb having a corresponding plug form to that of plug part 64.

Figure 7:
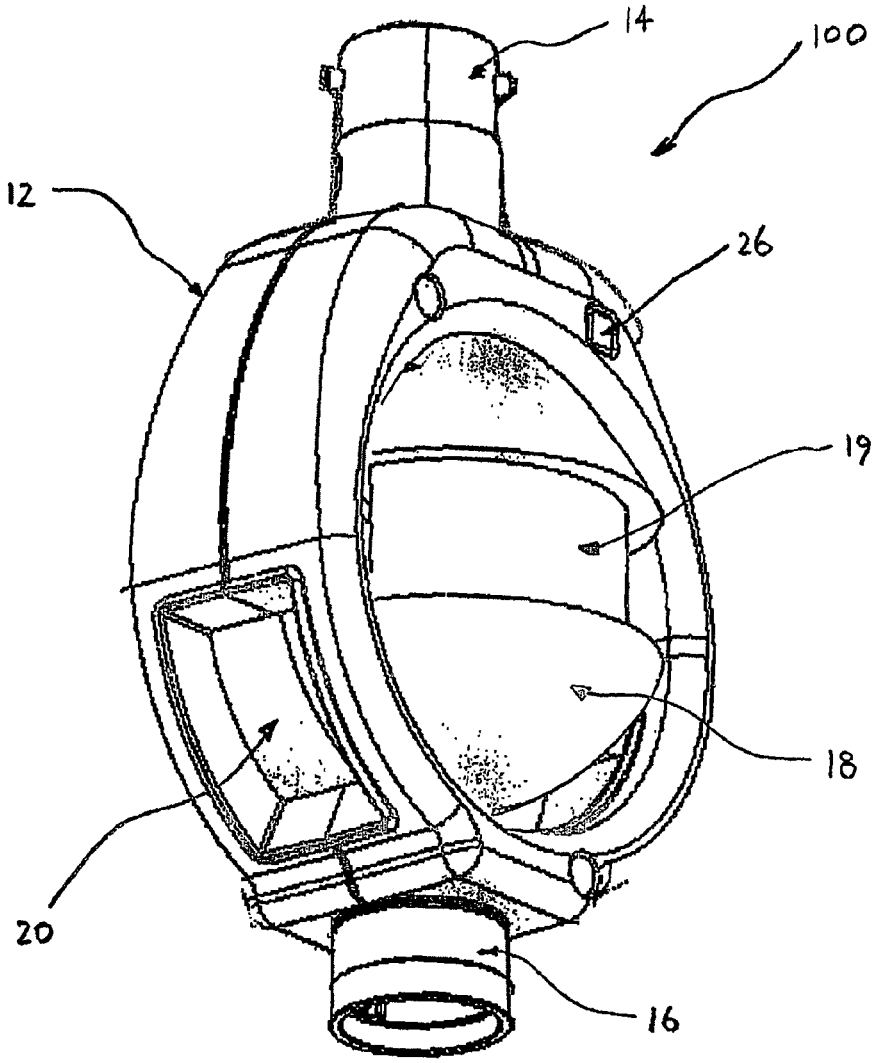
FIG. 7 is a perspective view of an adaptor of another embodiment of the invention.
Figure 8:
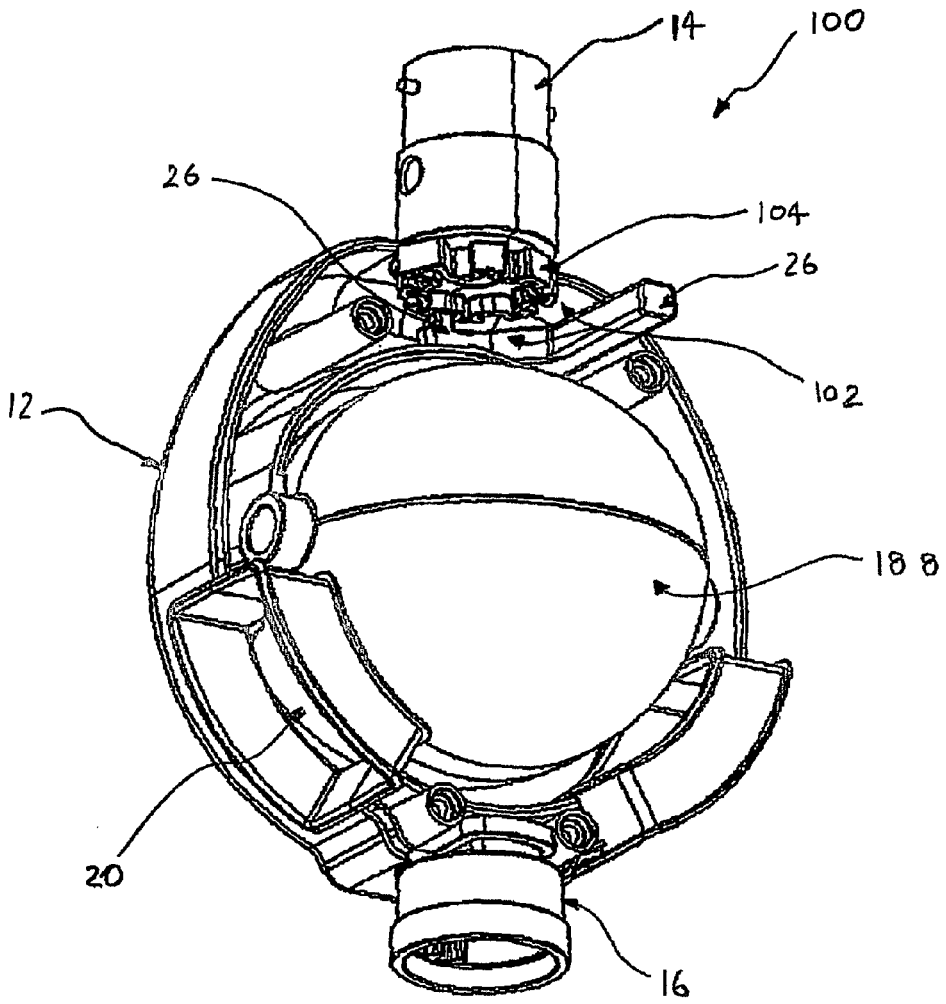
FIG. 8 is a partial cut-away view of the embodiment of FIG. 7 showing the locking mechanism.

FIGS. 7 and 8 show a preferred embodiment of the adaptor, designated by reference numeral 100. This embodiment differs from previously described embodiments in its external appearance and locking mechanism 102. As shown in FIG. 8, the locking mechanism 102 comprises a ratchet wheel 104 and pawl (or locking pin) 26. The ratchet wheel 104 and pawl 26 operate in a conventional manner to lockably rotate the annular housing 12 about the male connector (or plug part) 14. The annular housing 12 is lockably rotatable about the male connector 14 up to a maximum of about 350°. The sensor 18 is similarly rotatable to a maximum of about 350°.

It should be noted that the present invention is not limited to the particular embodiments described above, but can be implemented using different combinations of conventional electrical connections, sensors and electrical devices.

The male connector of the adaptor of the present invention is not limited to being connectable with conventional light fittings, but may also be configured to connect with conventional electrical fittings, such as wall mounted electrical sockets.

The sensor used in the adaptor of the present invention is not limited to a motion detector, but may also be implemented using one or more of an infrared detector, a photodetector and a sound detector.

The adaptor of the present invention is not limited to connect with and control light sources, but may also be implemented to connect with and control other electrical devices such as mobile telephones or sound alarms. In these embodiments, the female connector of the adaptor may be configured to connect with a mobile telephone or sound alarm. For example, embodiments of the present invention may use the sensor to selectively control a mobile telephone so that it transmits a call to a predetermined telephone number in response to a sensed condition, such as movement. Other embodiments of the present invention may be implemented using a sound alarm so that an audible alarm is generated in response to a sensed condition. These embodiments may be used in security applications. In other security applications, the adaptor may be adapted to control a security device, such as a burglar alarm, or a monitoring device, such as a surveillance camera.

Certain modifications or enhancements to the above described embodiments may be apparent to those skilled in the art without departing from the spirit and scope of the invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. An adaptor comprising:

a sensor;

a gimbal housing having a male connector at one end and a female connector at another end, wherein the male connector is configured to connect with an electrical socket and the female connector is configured to connect with an electrical device; and a circuit for selectively controlling the electrical device in response to the sensor;

wherein the gimbal housing is adapted to rotate around the male connector about a first axis and support the sensor for independent rotation about a second axis perpendicular to the first axis so that the sensor can be moved to a selectable sensing orientation, and

[wherein the one or more openings comprise first and second windows respectively formed in opposite sides of the gimbal mounting between the second axis and the female connector] *wherein the sensor is substantially spherical in shape and the gimbal housing is substantially annular in shape so that the sensor is supported at least partially inside the gimbal housing between the male connector and the female connector*.

2. An adaptor according to claim 1, wherein the sensor comprises one of a motion detector, an infrared detector, a photodetector and a sound detector.

3. An adaptor according to claim 1, wherein the male connector and the female connector are respectively provided on opposite ends of the gimbal housing in alignment with the first axis.

4. An adaptor according to claim 1, wherein the electrical socket is a light socket.

5. An adaptor according to claim 1, wherein the electrical device comprises a light source.

6. An adaptor according to claim 5, wherein the light source is a light bulb.

7. An adaptor according to claim 1, wherein the electrical device comprises one of a mobile telephone, a sound alarm, a security device, and a monitoring device.

8. An adaptor according to claim 7, wherein the security device comprises a burglar alarm.

9. An adaptor according to claim 7, wherein the monitoring device comprises a surveillance camera.

10. An adaptor according to claim 1, wherein the gimbal housing has one or more openings formed therein to correspond with at least some selectable sensing orientations of the sensor.

11. An adaptor according to claim 10, wherein the one or more openings comprise first and second windows respectively formed in opposite sides of the gimbal mounting between the second axis and the female connector.

12. An adaptor according to claim 1, wherein the gimbal housing further comprises a locking mechanism for lockably rotating the gimbal housing about the male connector.

13. An adaptor according to claim 12, wherein the locking mechanism comprises a ratchet wheel and pawl.

14. An adaptor according to claim 1, wherein the sensor is adapted to rotate less than 360° around the second axis.

15. An adaptor according to claim 14, wherein the sensor is adapted to rotate to a maximum of about 350° around the second axis.

16. An adaptor according to claim 1, wherein the gimbal housing is adapted to rotate less than 360° around the first axis.

17. An adaptor according to claim 16, wherein the gimbal housing is adapted to rotate to a maximum of about 350° around the first axis.

18. A method for operating an electrical device comprising the steps of:

connecting one end of the adaptor claimed in claim 1 to the electrical device and a second end to an electrical socket;

supporting a sensor in a gimbal housing between the ends of the adaptor so that the sensor is rotatable about two mutually orthogonal axes;

moving the sensor to a selectable sensing orientation; and selectively controlling the electrical device in response to the sensor.

19. A method for operating an electrical device according to claim 18, wherein the electrical device comprises a light source.

20. A method for operating an electrical device according to claim 19, wherein the light source is a light bulb.

21. A method for operating an electrical device according to claim 18, wherein the electrical device comprises one of a mobile telephone, a sound alarm, a security device, and a monitoring device.

22. A method for operating an electrical device according to claim 21, wherein the security device comprises a burglar alarm.

23. A method for operating an electrical device according to claim 21, wherein the monitoring device comprises a surveillance camera.

24. A method for operating an electrical device according to claim 18, wherein the sensor comprises one of a motion detector, an infrared detector, a photodetector and a sound detector.

* * * * *